United States Patent
Khair et al.

[19]

[11] Patent Number: 6,138,649
[45] Date of Patent: *Oct. 31, 2000

[54] FAST ACTING EXHAUST GAS RECIRCULATION SYSTEM

[75] Inventors: Magdi K. Khair; Christopher A. Sharp, both of San Antonio, Tex.

[73] Assignee: Southwest Research Institute, San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/156,105

[22] Filed: Sep. 17, 1998

Related U.S. Application Data

[60] Provisional application No. 60/059,487, Sep. 22, 1997.

[51] Int. Cl.[7] .................................................. F02M 25/07
[52] U.S. Cl. ............................... 123/568.12; 123/559.2; 123/568.21
[58] Field of Search ........................ 123/568.11, 568.12, 123/568.17, 568.21, 559.2

[56] References Cited

U.S. PATENT DOCUMENTS

| | | | |
|---|---|---|---|
| 3,941,035 | 3/1976 | Mueller | 92/49 |
| 4,373,498 | 2/1983 | Ushimura | 123/571 |
| 4,466,248 | 8/1984 | Nartowski | 60/602 |
| 4,474,008 | 10/1984 | Sakurai et al. | 60/605 |
| 4,885,911 | 12/1989 | Woollenweber et al. | 60/597 |
| 4,945,870 | 8/1990 | Richeson | 123/90.11 |
| 4,958,497 | 9/1990 | Kawamura | 60/608 |
| 5,038,566 | 8/1991 | Hara | 60/608 |
| 5,123,397 | 6/1992 | Richeson | 123/568 |
| 5,168,706 | 12/1992 | Kawamura | 60/608 |
| 5,203,311 | 4/1993 | Hitomi et al. | 60/605.2 |
| 5,207,714 | 5/1993 | Hayashi et al. | 123/568.17 |
| 5,284,116 | 2/1994 | Richeson, Jr. | 123/425 |
| 5,297,515 | 3/1994 | Gale et al. | 123/3 |
| 5,353,776 | 10/1994 | Burrahm et al. | 123/700 |

(List continued on next page.)

FOREIGN PATENT DOCUMENTS

| | | |
|---|---|---|
| 606244 | 10/1960 | Canada . |
| 0 596 855 A1 | 10/1993 | European Pat. Off. . |
| 06123259 | 6/1994 | European Pat. Off. . |
| 08254159 | 1/1996 | European Pat. Off. . |
| 40 07516 A1 | 9/1991 | Germany . |
| 4342296C1 | 11/1994 | Germany . |
| 9421145U1 | 5/1995 | Germany . |
| 60-184918 | 9/1985 | Japan . |
| 224277 | 2/1943 | Switzerland . |
| 1437171 | 5/1976 | United Kingdom . |
| WO 95/23280 | 8/1995 | WIPO . |
| WO 96/30635 | 10/1996 | WIPO . |

OTHER PUBLICATIONS

TURBODYNE Brochure, "Performance for Your Engine and the Environment," 11 pgs, undated.

*Primary Examiner*—Henry C. Yuen
*Assistant Examiner*—Arnold Castro
*Attorney, Agent, or Firm*—Baker Botts L.L.P.

[57] ABSTRACT

A system is provided for rapidly changing the flow of recirculated exhaust gas to each cylinder of an internal combustion engine operating on diesel fuel or other fuels. The system preferably includes an exhaust gas recirculation line having an exhaust gas recirculation pump along with a reservoir and cooler for storing a desired volume of recirculated exhaust gas. Recirculated exhaust gas is preferably supplied from the reservoir to each cylinder of the associated engine through respective recirculated exhaust gas conduits. A metering valve is preferably disposed within each recirculated exhaust gas conduit immediately adjacent to each cylinder. The metering valves provide uniform distribution of recirculated exhaust gas to the respective cylinders and allow the system to rapidly change the flow of recirculated exhaust gas to each cylinder. The system provides recirculated exhaust gas at a point close to the combustion chamber where it is needed for effective reduction of undesirable $NO_x$ emissions.

23 Claims, 8 Drawing Sheets

U.S. PATENT DOCUMENTS

| | | | |
|---|---|---|---|
| 5,440,880 | 8/1995 | Ceynow et al. | 60/605.2 |
| 5,499,605 | 3/1996 | Thring | 123/70 R |
| 5,524,599 | 6/1996 | Kong et al. | 123/682 |
| 5,560,208 | 10/1996 | Halimi et al. | 60/608 |
| 5,605,045 | 2/1997 | Halimi et al. | 60/607 |
| 5,607,010 | 3/1997 | Schonfeld et al. | 165/51 |
| 5,611,204 | 3/1997 | Radovanovic et al. | 60/605.2 |
| 5,617,726 | 4/1997 | Sheridan et al. | 60/605.2 |
| 5,740,786 | 4/1998 | Gartner | 123/568.12 |
| 5,771,868 | 6/1998 | Khair | 123/568.12 |
| 5,806,308 | 9/1998 | Khair et al. | 123/568.12 |

OTHER PUBLICATIONS

Magdi K. Khair, "Progress in Diesel Engine Emissions Control," presented at the ASME Energy–Sources Technology Conf. and Exhibition–Jan. 26–30, 1992, Houston, Texas, *The American Society of mechanical Engineers*, 11 pages.

Research http://www.epa.gov/docs/Press Releases/1996/June/Day–21/pr–739.html, Environmental Protection Agency, "EPA Proposes Plan for Reducing Ozone Pollution from Heavy Trucks," 1 page.

Reprinted from *Federal Registry*, Environmental Protection Agency, 40 CFR Part 86, "Control of Emissions of Air Pollution from Highway Heavy–Duty Engines," Notice of Proposed Rulemaking, pp. 1–95, no date.

Control of Emissions of Air Pollution from Heavy–Duty Engines Notice of Proposed Rulemaking, Draft Regulatory Text–pp. 1–42, no date.

National NOx Emissions Projections/Graphs, eight figures, no date.

Service Manual for "Low Emission 3208 Engine with Exhaust Gas Recirculation" Serial Nos. 40S1–UP, Form #SENR7455, *Caterpillar*, 28 pages, 1976.

FAST ACTING EXHAUST GAS RECIRCULATION SYSTEM

CROSS-REFERENCE TO RELATED APPLICATIONS

This application claims priority under 35 U.S.C. § 119(e) of provisional application number 60/059,487 filed Sep. 22, 1997.

TECHNICAL FIELD OF THE INVENTION

This invention relates generally to apparatus and methods for recirculation of exhaust gas in an internal combustion engine. More particularly, but not by way of limitation, this invention relates to apparatus and methods for rapid and precise metering of recirculated exhaust gas to individual cylinders of an internal combustion engine such as a diesel engine.

BACKGROUND OF THE INVENTION

Proposals for future federal, state and local regulations on controlling emissions from internal combustion engines generally call for increased reductions in nitrogen oxide ($NO_x$) while keeping particulate emissions at or below current levels. Representatives of the diesel engine industry and some regulatory agencies have signed a Statement of Principles document which calls for combined $NO_x$ and hydrocarbon (HC) emissions of 2.5 grams per brake horse power-hour (g/bhp-hr) or less and particulate matter emissions of 0.10 g/bhp-hr or less by the year 2004. The U.S. Environmental Protection Agency (EPA) issued a notice of proposed rule making entitled Control of Emissions of Air Pollution from Highway Heavy-duty Engines (61 F.R. 33421, Jun. 27, 1996) with proposed changes to 40 C.F.R. Part 86 based in part on this Statement of Principles.

In the past significant progress has been achieved in reducing diesel engine emissions by various changes in engine design and fuel system design. Fuel improvements and exhaust after treatment techniques have also been used to meet the challenge of lower allowable levels of engine exhaust emissions. At the same time, customers are demanding greater fuel efficiency and extended engine life with fewer maintenance requirements. As a result, several difficult design tradeoffs must often be made to meet these sometimes conflicting goals. For example reducing $NO_x$ emissions from a diesel engine by retarding injection timing may have a negative impact upon fuel economy. Also, design changes made to reduce particulate emissions may increase $NO_x$ emissions and vice versa. The task of maintaining good fuel economy is especially difficult with the need to control $NO_x$ and particulate emissions at the new, proposed relatively low levels in comparison with prior acceptable standards. A paper entitled *Progress in Diesel Engine Emissions Control* by Magdi K. Khair was presented at the ASME Energy-Sources Technology Conference and Exhibition during January 1992 in Houston and provided a summary of previous changes made to improve performance while reducing emissions from diesel engines.

One technology which shows promise in helping engine designers meet the objectives of reduced emissions with the same or improved fuel efficiency is exhaust gas recirculation (EGR). EGR technology has been used for some time in light duty diesel engines to effectively reduce $NO_x$ emissions to levels approaching those proposed as future standards. Exhaust gas recirculation reduces $NO_x$ in diesel engines by diluting the oxygen induced with the fresh charge air as well as acting as a heat sink in the combustion process. One side effect of increased EGR is often an increase in insoluble particulate matter, primarily soot, in exhaust gas exiting from the cylinders or combustion chambers. This increase in particulate matter often results in the need to add complex, expensive exhaust gas after treatment systems such as particulate traps to maintain low levels of particulate emissions from the associated diesel engine.

Conventional EGR systems for diesel engines generally employ a single control valve or metering valve which is typically located a considerable distance from the associated intake manifold. Conventional EGR systems often include a cooler disposed between the control valve and the associated intake manifold. As a result of this configuration, pipes, ducts or other types of fluid flow conduits with considerable volume are frequently installed between the single control valve of conventional EGR systems and the associated intake manifold. This volume must be filled or emptied by the conventional EGR system in response to changes in engine operating conditions. As a result of this volume, conventional EGR systems generally have a slow response time to changes in engine operating conditions. During such changes in engine operating conditions, exhaust gas may be supplied to the intake manifold when it is not required which may result in an unnecessary increase in particulate emission. Alternatively, exhaust gas may not be supplied fast enough to the intake manifold when it is required which may result in an increase in $NO_x$ emissions above desired levels.

Another problem associated with conventional EGR systems includes uneven distribution of exhaust gas between the individual cylinders of the associated internal combustion engine. A conventional EGR system having only a single control valve typically relies upon mixing within the intake manifold of the fresh air charge and the exhaust gas supplied by the EGR systems. Intake manifolds are generally not designed to optimize such mixing of air and exhaust gas, particularly when the ratio of exhaust gas to fresh air is relatively large. As a result, different amounts of exhaust gas may be supplied to respective cylinders of the associated engine. Uneven distribution of exhaust gas by conventional EGR systems tends to increase insoluble particulate emissions from the cylinders receiving larger portions of such exhaust gas.

For some applications, the amount of residual exhaust gas remaining in the cylinders or combustion chambers of an internal combustion engine may be varied in an attempt to control $NO_x$ emissions. Typically, the amount of residual exhaust gas remaining in a combustion chamber or cylinder will depend upon the timing for opening and closing of intake ports and exhaust ports associated with the respective combustion chamber or cylinder. However, such residual exhaust gas cannot be effectively cooled. Therefore, over all, engine operating efficiency generally declines as residual exhaust gas in a combustion chamber or cylinder increases.

SUMMARY OF THE INVENTION

In accordance with teachings of the present invention, methods and apparatus are provided to control the volume of exhaust gas supplied to each cylinder of an internal combustion engine. As a result, an exhaust gas recirculation system incorporating teachings of the present invention may rapidly respond to changing engine operating conditions which will substantially reduce or eliminate disadvantages and problems associated with previous exhaust gas recirculation systems for such engines.

One aspect of the present invention includes an exhaust gas recirculation (EGR) system which will precisely meter the volume of exhaust gas supplied to each cylinder of an associated internal combustion engine. Preferably, the EGR system will meter the flow of exhaust gas at or near intake ports for respective cylinders to allow the EGR system to rapidly respond to changes in speed, load and/or other operating conditions of the associated engine. Controlling the flow of exhaust gas at each intake port also allows the EGR system to more evenly distribute the required amount of exhaust gas to each cylinder of the associated engine.

Another aspect of the present invention includes providing an EGR system with a fast response time to changes in the operating condition of the associated engine and more uniform distribution of the required amount of exhaust gas to each cylinder of the associated engine. Teachings of the present invention may be used with both high pressure loop EGR systems and low pressure loop EGR systems. A control valve or metering valve is preferably disposed adjacent to each intake port of the respective cylinders to minimize the volume of exhaust gas disposed between each control valve and the respective intake port which will significantly decrease the response time of the EGR system to changes in engine operating conditions. A reservoir or storage tank may also be provided to hold exhaust gas at pressures required for introduction into the associated intake manifold. For some applications, the exhaust gas reservoir and cooler may be provided by a portion of an intercooler such as associated with heavy-duty turbocharged and intercooled diesel engines. For other applications, the exhaust gas reservoir and cooler may be a separate component. A cooler or other appropriate heat exchanger may be included within the exhaust gas reservoir or storage tank. A pump or other means is preferably provided to maintain the pressure of exhaust gas in the reservoir at or above the pressure required to introduce exhaust gas into the intake manifold at engine operating conditions when such exhaust gas is required to control $NO_x$ emissions.

Technical advantages of an exhaust gas recirculation system incorporating teachings of the present invention include:

rapid response to changes in engine operating conditions;

precise metering of the amount of recirculated exhaust gas delivered to each cylinder of the associated engine;

even distribution of recirculated exhaust gas to all cylinders of the associated engine; and improved mixing of recirculated exhaust gas and fresh air supplied to each cylinder within a respective intake port for the cylinder.

Further technical advantages of the present invention further include providing an EGR system for heavy-duty turbocharged and intercooled diesel engines which is particularly effective in reducing undesirable gas ($NO_x$) emissions. The present invention results in maintaining good fuel economy while at the same time allowing substantial reductions in $NO_x$ emissions from the associated diesel engine. Combining electronically operated metering valves with an exhaust gas reservoir and exhaust gas pumps in accordance with teachings of the present invention allows the associated EGR system to quickly provide optimum air/fuel/exhaust gas ratios to each cylinder in response to changes in the operating condition of the associated diesel engine.

Cooling recirculated exhaust gas in accordance with teachings of the present invention further enhances engine performance and operating efficiency, particularly as compared to engines which use residual exhaust gas to help control $NO_x$ emissions. Placing an exhaust gas reservoir and cooler as close as possible to the combustion chambers or cylinders of an associated internal combustion engine in accordance with teachings of the present invention enhances the effectiveness of the EGR system in controlling $NO_x$ emissions while minimizing any adverse effects of EGR on engine operating efficiency.

BRIEF DESCRIPTION OF THE DRAWINGS

For a more complete understanding of the present invention and advantages thereof, reference is now made to the following descriptions taken in conjunction with the accompanying drawings, in which.

DETAILED DESCRIPTION OF THE INVENTION

The preferred embodiments of the present invention and its advantages are best understood by referring to FIGS. 1–8 of the drawings, like numerals being used for like and corresponding parts of the various drawings. Piping and/or ducting with recirculated exhaust gas flowing therethrough is generally shown with stippling in FIGS. 1–4.

Figure 1:
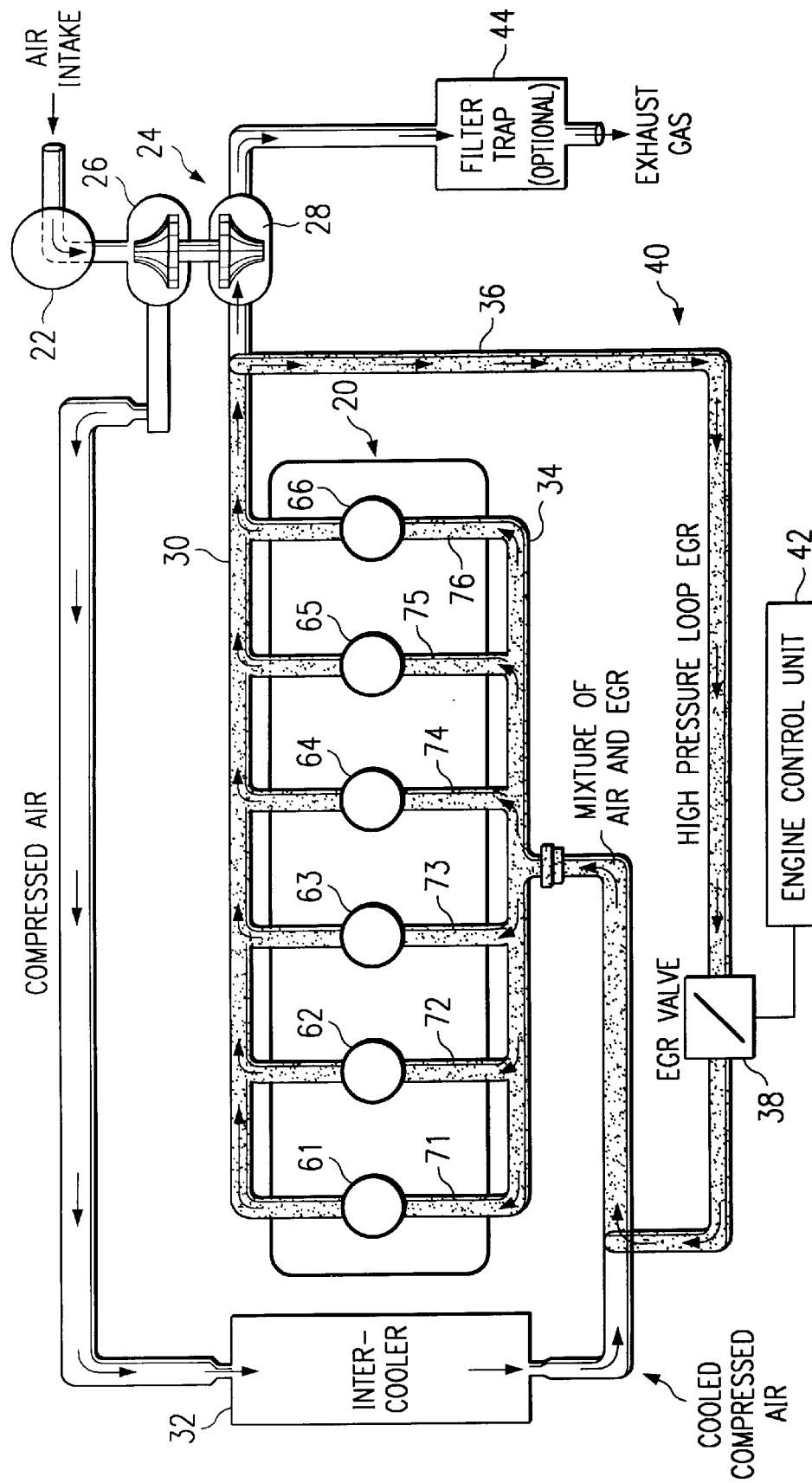
FIG. 1 is a schematic drawing showing a block diagram of various components associated with a typical heavy-duty turbocharged and intercooled diesel engine having a conventional high pressure loop exhaust gas recirculation system.

FIG. 1 is a schematic block diagram showing various components associated with internal combustion engine 20, exhaust gas recirculation (EGR) system 40 and engine control unit 42. A wide variety of internal combustion engines such as shown in U.S. Pat. Nos. 5,297,515; 5,353,776; and 5,499,605 may be satisfactorily used with the present invention.

For many applications, engine 20 will preferably be a heavy-duty turbocharged and intercooled diesel engine which may be frequently operated at various loads and speeds. For other applications, the present invention may be used with spark ignited internal combustion engines and is not limited to use with only diesel engines nor with engines that have a turbocharger. For example the present invention may be satisfactorily used with internal combustion engines which operate with natural gas, gasoline, hydrogen, propane, butane, alcohol or any other air/fuel mixture. The present invention may also be satisfactorily used with internal combustion engines that do not have increased induction system pressure or which use equipment other than a turbocharger to provide increased induction system pressure.

Teachings of the present invention may be satisfactorily used with any internal combustion engine that will benefit from having an exhaust gas recirculation system with rapid response to changes in engine operating conditions, precise metering of recirculated exhaust gas delivered to each cylinder of the associated engine, even distribution of recirculated exhaust gas to all cylinders of the associated engine and/or improved mixing of recirculated exhaust gas and fresh air within each intake port of all cylinders of the associated engine.

Exhaust gas recirculation system 40, as shown in FIG. 1, may sometimes be referred to as a high pressure loop (HPL) EGR system. A supply of diesel fuel (not expressly shown) is preferably provided for engine 20. An air intake system (not expressly shown) provides a supply of fresh intake air through filter 22 to compressor 26 of turbocharger 24. A first portion of the exhaust gas exiting from exhaust manifold 30 of engine 20 is also supplied to intake manifold 34 through exhaust gas recirculation line 36. A second portion of the exhaust gas flows through turbine or expansion section 28 of turbocharger 24 to rotate compressor 26. As a result, intake air exiting from compressor 26 of turbocharger 24 is compressed and heated. The compressed intake air preferably flows through intercooler 32 to intake manifold 34. Intercooler 32 as shown in FIGS. 1 through 4, is probably an air-to-air type heat exchanger. However, other types of diesel engine cooler or heat exchanger may be satisfactorily used as intercooler 32.

The induction pressure within intake manifold 34 is usually greater than the pressure of exhaust gas exiting from turbine 28. Therefore, one end of EGR line 36 is preferably connected between exhaust manifold 30 and the input side of turbine 28. The other end of EGR line 36 is preferably connected with the cooled, compressed air flowing out of intercooler 32 prior to intake manifold 34. EGR system 40 may be referred to as a high pressure loop EGR system since, in many cases, the pressure in exhaust manifold 30 and EGR line 36 will be higher than the induction pressure in intake manifold 34.

Engine control unit 42 is preferably provided to control, among other components and functions associated with engine 20, the position of EGR valve 38 which regulates the flow of recirculated exhaust gas from exhaust manifold 30 to intake manifold 34 based on engine operating conditions.

For some applications, exhaust gas recirculation systems having a high pressure loop, such as shown in FIG. 1, have proven successful in reducing $NO_x$ emissions from heavy-duty diesel engines to less than two grams per brake horsepower-hour (2.0 g/bhp-hr) over the EPA transient emission cycle test. When initially used, such high pressure loop EGR systems often resulted in an increase in particulate emissions from the associated diesel engine. Therefore, exhaust gas exiting from turbine 28 of turbocharger 24 preferably flows through filter trap 44 to reduce such particulate emissions.

Figure 2:
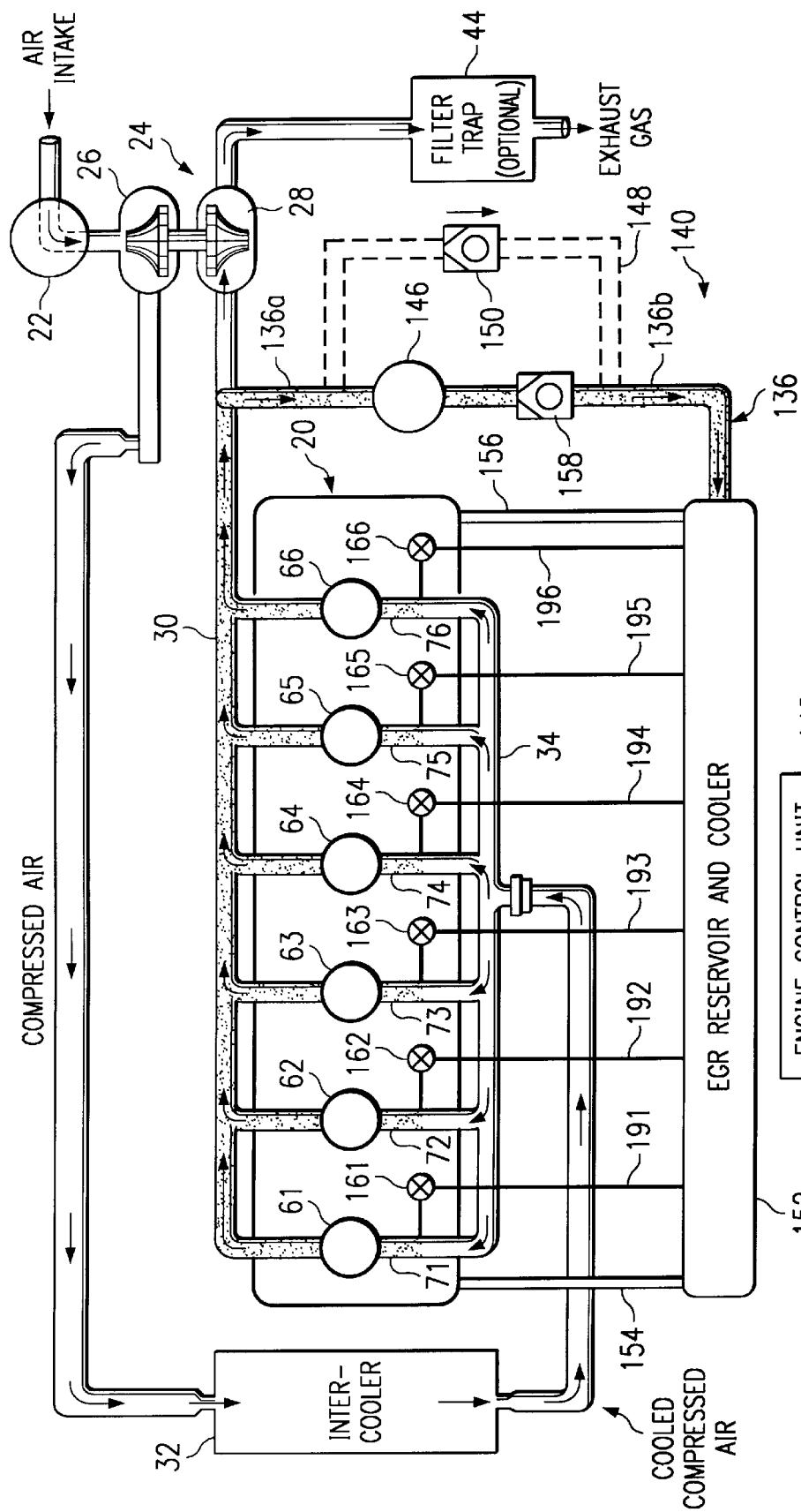
FIG. 2 is a schematic drawing showing a block diagram of various components associated with the heavy-duty turbocharged and intercooled diesel engine of FIG. 1 having a high pressure loop exhaust gas recirculation system incorporating teachings of the present invention.
Figure 5:
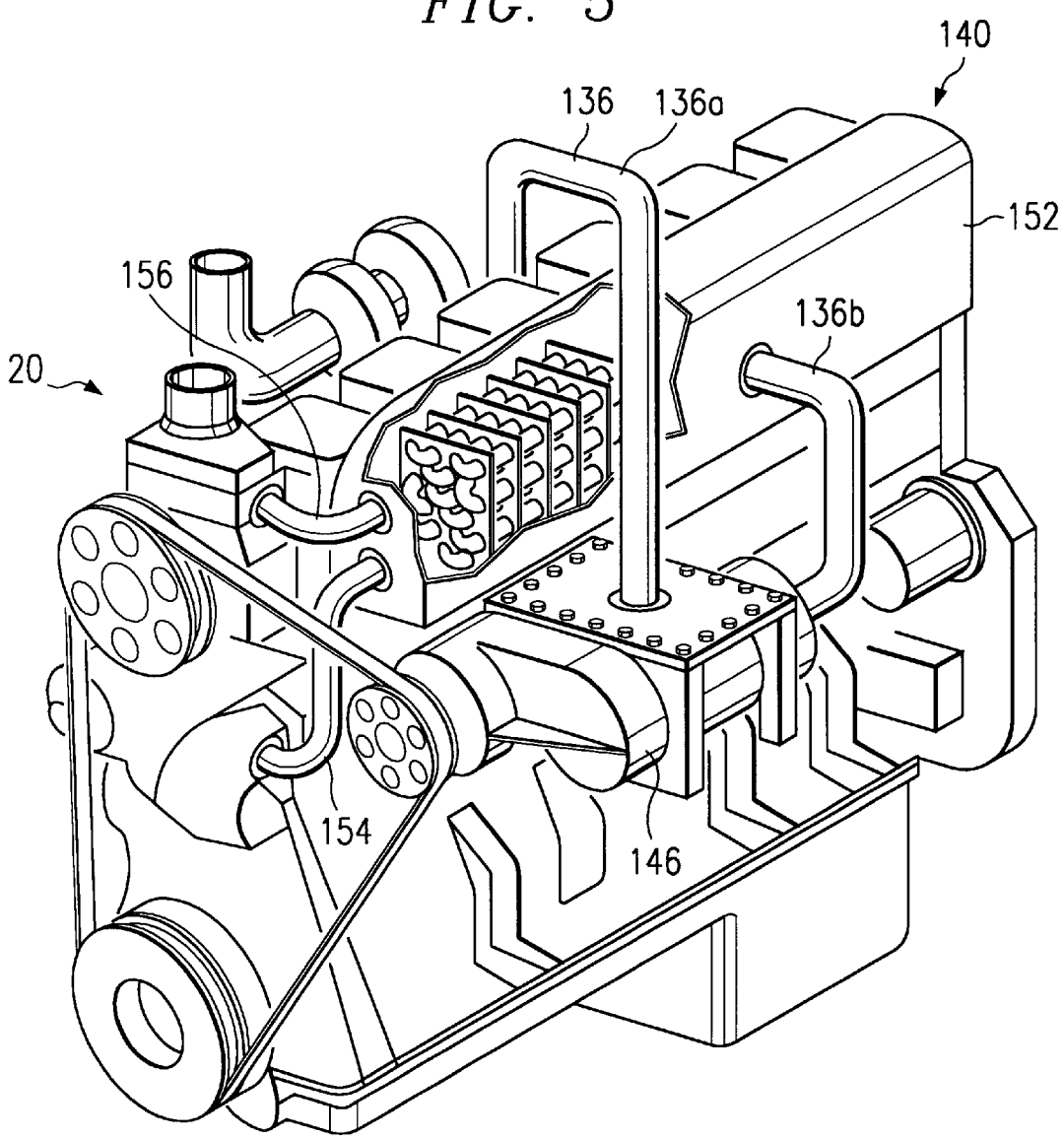
FIG. 5 is a schematic drawing showing an isometric view of a typical heavy-duty turbocharged and intercooled diesel engine having a high pressure loop exhaust gas recirculation system incorporating teachings of the present invention.
Figure 6:
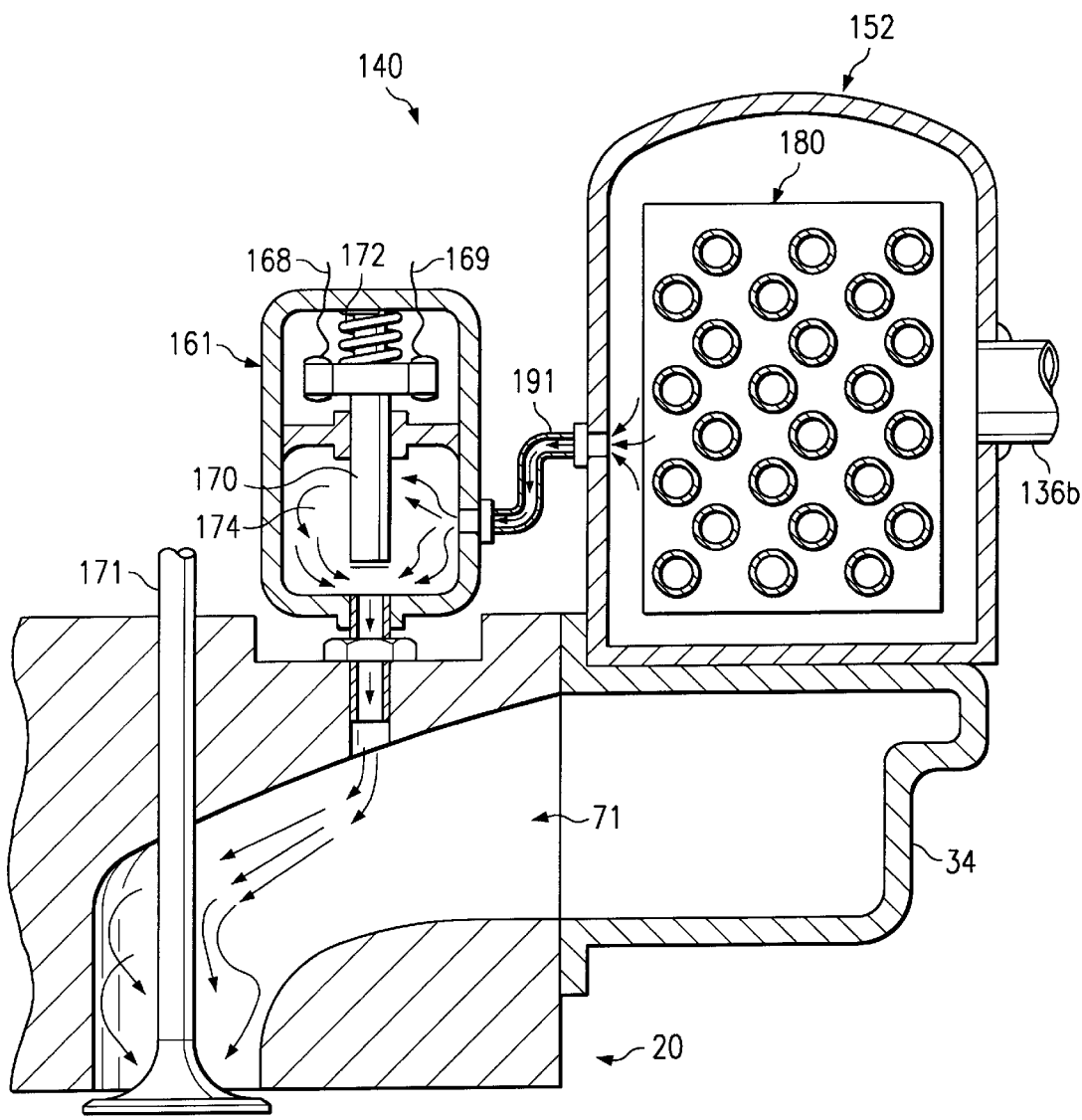
FIG. 6 is a schematic drawing in section and in elevation with portions broken away showing various components of an exhaust gas recirculation system and an internal combustion engine incorporating teachings of the present invention.

FIG. 2 shows internal combustion engine 20 having exhaust gas recirculation system or EGR system 140 which incorporates various teachings of the present invention. Portions of EGR system 140 and engine 20 are also shown in FIGS. 5 and 6 which will be discussed later in more detail.

EGR system 140 may be generally described as a high pressure loop EGR system since exhaust gas recirculation line or EGR line 136 is connected between exhaust manifold 30 and the input to turbine 28. EGR system 140 preferably includes exhaust gas recirculation pump or EGR pump 146, EGR reservoir and cooler 152, a plurality of exhaust gas conduits 191–196 and a corresponding plurality of exhaust gas metering valves 161–166. Exhaust gas conduits 191–196 and exhaust gas metering valves 161–166 correspond respectively with cylinders 61–66 of engine 20. Exhaust gas conduits 191–196 may sometimes be referred to as "EGR conduits." Exhaust gas metering valves 161–166 may sometimes be referred to as "EGR metering valves" or "EGR control valves."

EGR line 136 directs a portion of the exhaust gas flowing from exhaust manifold 30 to EGR pump 146. For one application, EGR pump 146 may be a positive displacement clutch-activated pump such as shown in FIG. 5. For other applications, EGR pump 146 may be an electrically driven compressor. EGR pump 146 is preferably selected to provide the desired recirculated exhaust gas flowrate and pressure based on anticipated operating conditions of the associated engine.

Figure 7:
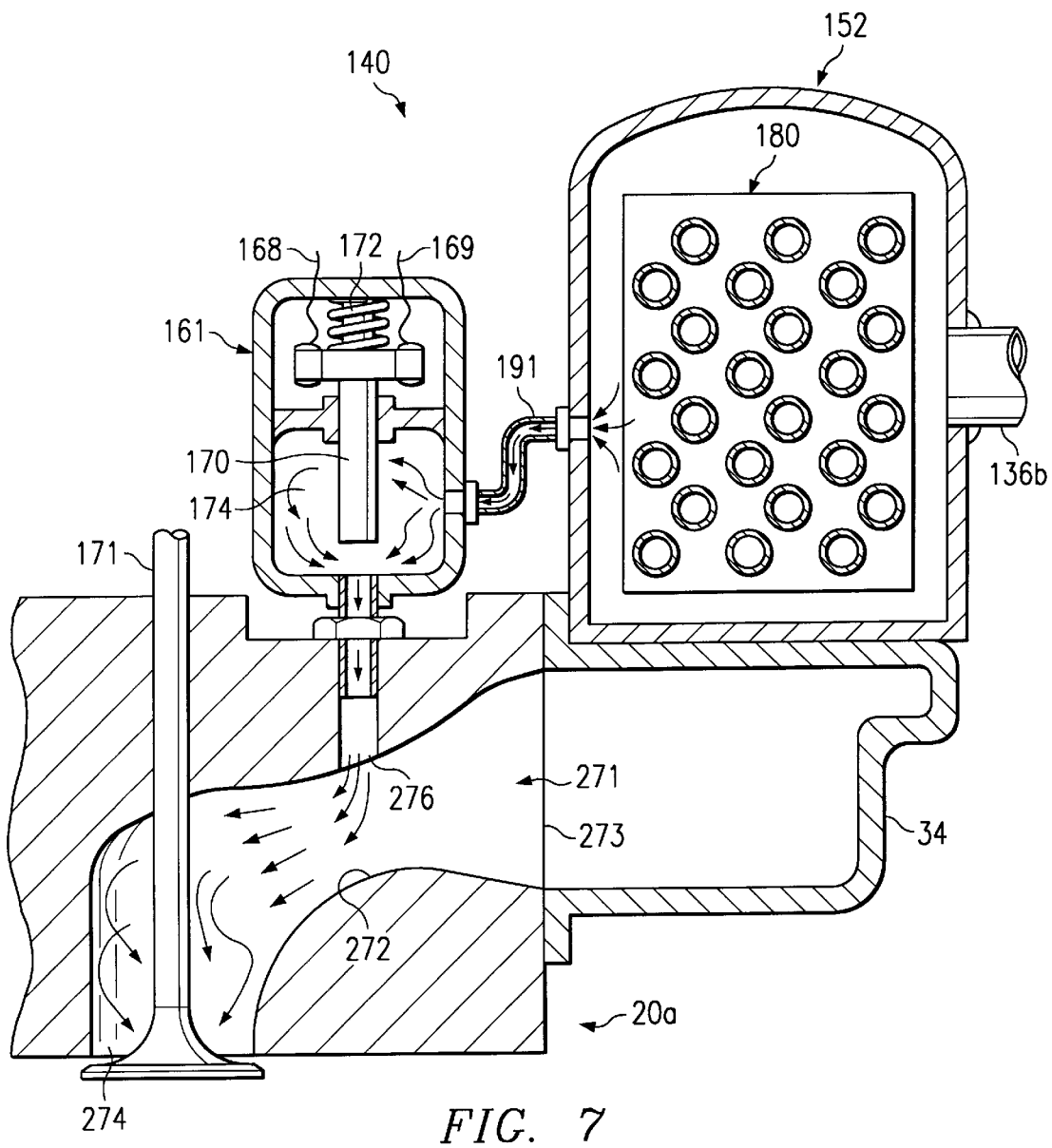
FIG. 7 is a schematic drawing in section and in elevation with portions broken away showing various components of an exhaust gas recirculation system and an internal combustion engine incorporating teachings of the present invention including an intake port having the general configuration of a venturi.
Figure 8:
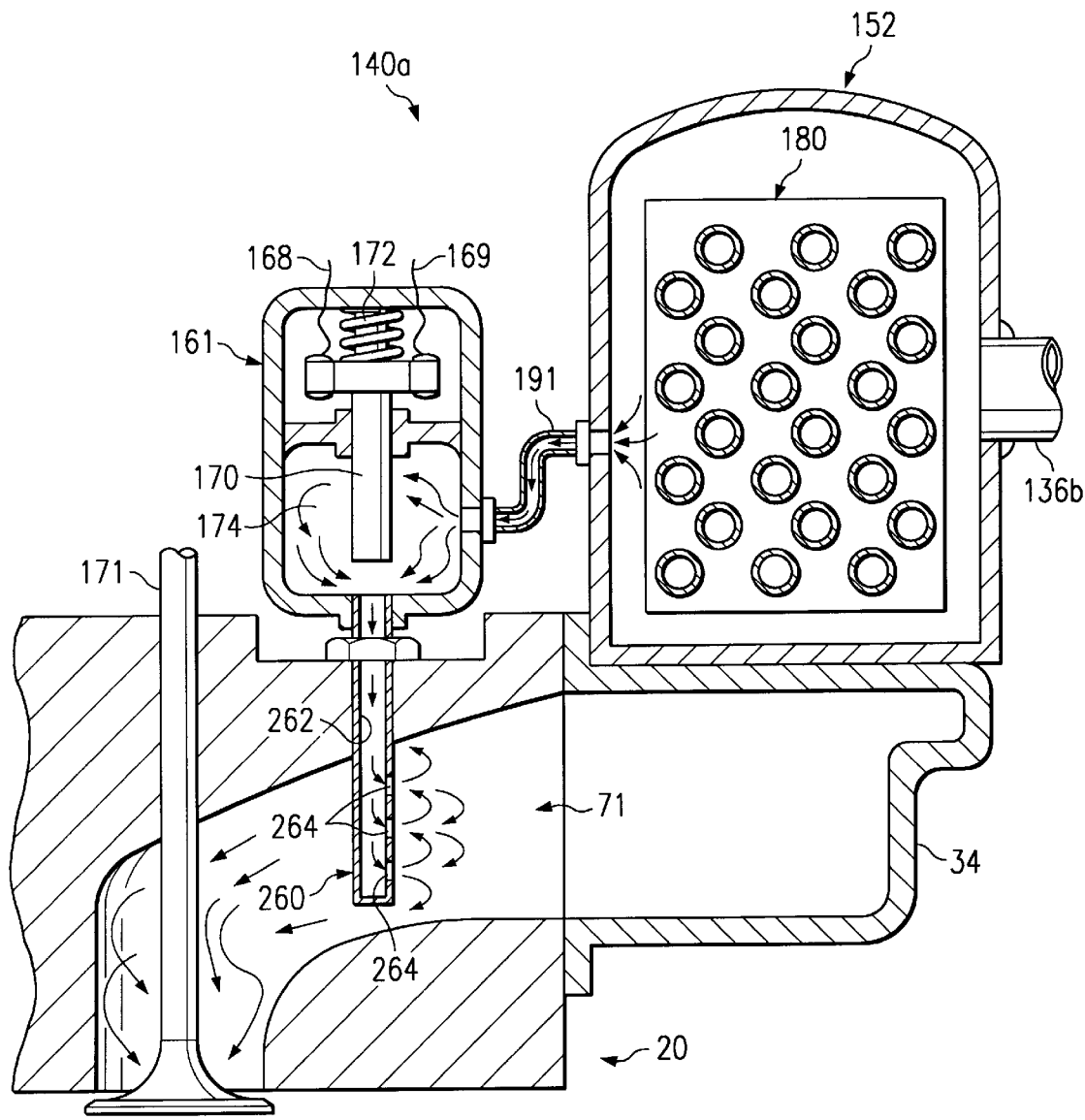
FIG. 8 is a schematic drawing in section and in elevation with portions broken away showing various components of an exhaust gas recirculation system and an internal combustion engine incorporating teachings of the present invention including a perforated pipe for better mixing of recirculated exhaust gas with air entering an intake port of the engine.

EGR reservoir and cooler 152 is preferably connected with the output from EGR pump 146. For some applications such as shown in FIGS. 2, 4 and 5–8, EGR reservoir and cooler 152 may be generally described as a jacketed water heat exchanger. Water heat exchanger 180 is preferably disposed within EGR reservoir and cooler 152 as best shown in FIGS. 6, 7 and 8. Water from the cooling system associated with engine 20 may be used to cool recirculated exhaust gas contained within EGR reservoir and cooler 152.

During some operating conditions of engine 20, exhaust gas pressure in exhaust manifold 30 will be greater than the pressure of the compressed air supplied to intake manifold 34. During these engine operating conditions, EGR pump 146 may be deactivated or declutched from engine 20 to conserve power. During operating conditions, when exhaust gas pressure in exhaust manifold 30 is less than the pressure of compressed air supplied to intake manifold 34, EGR pump 146 is preferably engaged to increase the pressure of recirculated exhaust gas flowing through EGR line 136 to a desired value above the pressure of compressed air within intake manifold 34.

For some applications, bypass line 148, as shown by dotted lines in FIG. 2, may be installed around EGR pump 146. One end of bypass line 148 is preferably coupled with first portion 136a of EGR line 136 attached to the inlet for EGR pump 146. The other end of bypass line 148 is preferably connected with second portion 136b of EGR line 136 extending from the outlet for EGR pump 146 to EGR reservoir and cooler 152. Back pressure valve 150 or any other suitable flow control device may be installed within bypass line 148 to allow exhaust gas to bypass EGR pump 146 when exhaust gas pressure in exhaust manifold 30 is above a desired level as compared to the induction pressure in intake manifold 34.

For some applications, back pressure valve 158 or other suitable flow control device such as a one-way check valve may be installed in second portion 136b of EGR line 136. During engine operating conditions when the pressure of recirculated exhaust gas stored in EGR reservoir and cooler 152 is greater than the pressure of exhaust gas in exhaust manifold 30, back pressure valve 158, and also back pressure valve 150, if bypass line 148 is installed, will block undesired flow of recirculated exhaust gas from EGR reservoir and cooler 152 to exhaust manifold 30.

Engine control unit 142 will preferably provide an appropriate signal to activate or deactivate EGR pump 146 to maintain the desired pressure for recirculated exhaust gas within EGR line 136 and EGR reservoir and cooler 152. For some applications, engine control unit 142 may also control back pressure valves 150 and 158.

As previously noted recirculated exhaust gas which flows through EGR line 136 may be stored in EGR reservoir and cooler 152. In addition to storing recirculated exhaust gas, EGR reservoir and cooler 152 preferably reduces the temperature of recirculated exhaust gas supplied to cylinders 61–66 of engine 20. For some applications, an EGR reservoir or storage tank and a cooler may be installed as separate components within EGR line 136. For other applications, an EGR reservoir or storage tank and an EGR cooler may be combined into a single unit such as EGR reservoir and cooler 152 shown in FIG. 5. Reservoir and cooler 152 is preferably water cooled. However, an appropriate sized air-to-air heat exchanger may also be used to reduce the temperature of recirculated exhaust gas supplied to cylinders 61–66 of engine 20.

As shown in FIG. 2, exhaust gas conduits 191–196 are provided to communicate recirculated exhaust gas from EGR reservoir and cooler 152 with respective cylinders 61–66. For purposes of illustration, exhaust gas conduits 191–196 are shown in FIG. 2 as being relatively long. For many applications, EGR reservoir and cooler 152 is preferably mounted immediately adjacent to engine 20 such as shown in FIGS. 5 and 6 to minimize the length of exhaust gas conduits 191–192.

For the embodiment shown in FIG. 2, a plurality of EGR control valves or EGR metering valves 161–166 are disposed within respective exhaust gas conduits 191–196. EGR metering valves 161–166 are preferably disposed immediately adjacent to respective intake ports 71–76 corresponding with cylinders 61–66. One example of the preferred location of EGR reservoir and cooler 152 and metering valve 161 with respect to intake port 71 for cylinder 61 is shown in FIG. 6.

The number of exhaust gas conduits extending from the associated EGR reservoir and cooler and the number of metering or control valves preferably corresponds with the number of intake ports for the cylinders of the associated internal combustion engine. For example, engine 20 includes cylinders 61–66 with respective intake ports 71–76. Intake valves, such as intake valve 171 as shown in FIG. 6, are generally disposed within intake ports 71–76 to control the flow of compressed air and recirculated exhaust gas to respective cylinders or combustion chambers 61–66. Engine control unit 142 preferably provides an appropriate signal to regulate the opening and closing of EGR metering valves or control valves 161–166 depending upon the amount of recirculated exhaust gas required to reduce $NO_x$ emissions to below a desired level for the operating condition of engine 20.

Figure 4:
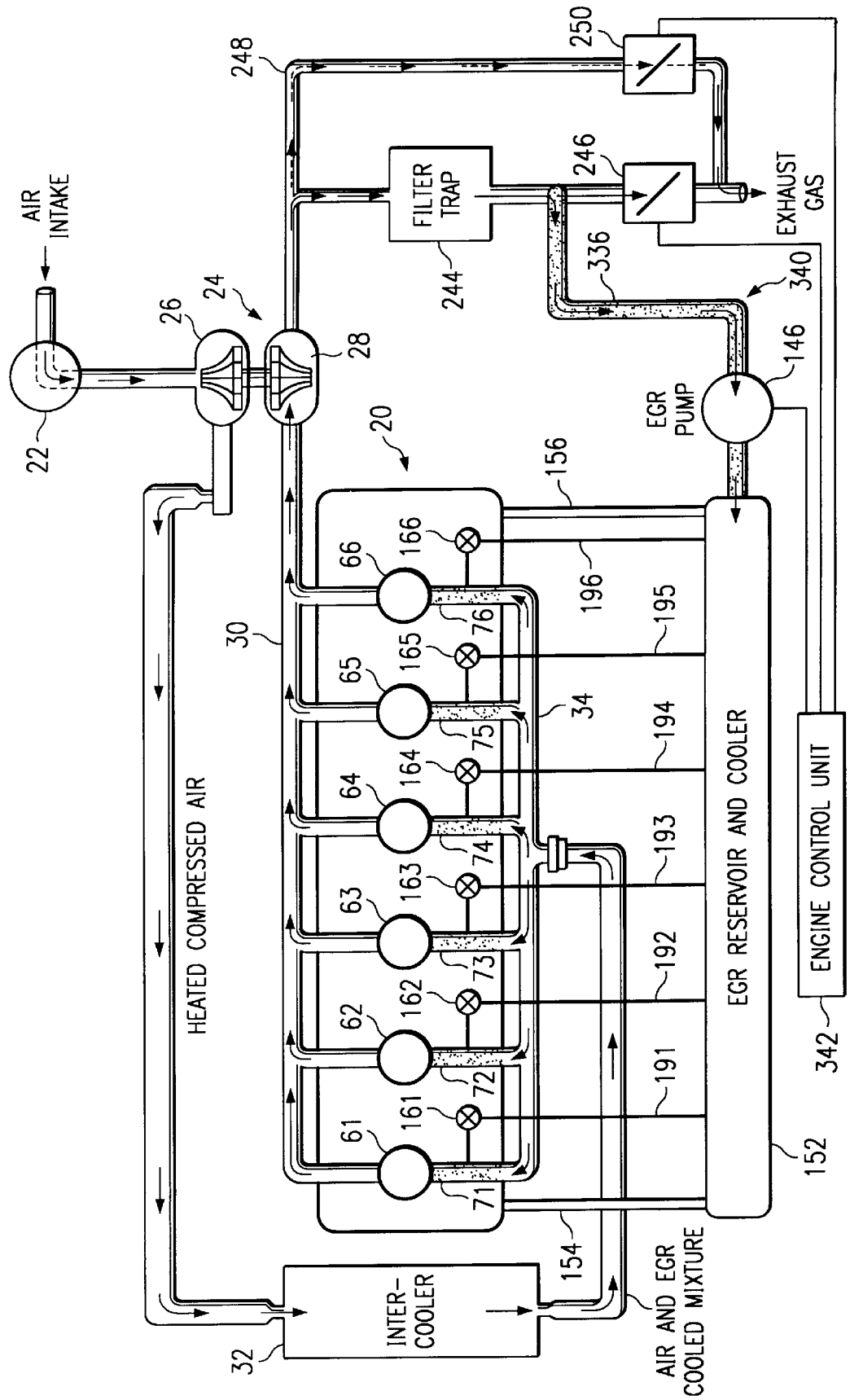
FIG. 4 is a schematic drawing showing a block diagram of various components associated with the heavy-duty turbocharged and intercooled diesel engine of FIG. 3 having a low pressure loop exhaust gas recirculation system incorporating teachings of the present invention.

For the embodiments shown in FIGS. 2 and 4, EGR reservoir and cooler 152 receives cooling water from the water cooling system associated with engine 20. Coolant supply line 154 is preferably provided to direct cooling water from engine 20 to EGR reservoir and cooler 152. Coolant return line 156 is provided to return cooling water from EGR reservoir and cooler 152 to engine 20.

For some applications, EGR reservoir and cooler 152 may use cooling air to reduce the temperature of recirculated exhaust gas flowing through the associated EGR cooler. U.S. Pat. No. 4,885,911 entitled Internal Combustion Engine Turbo System and Method discloses one type of air cooling system which may be satisfactorily used to reduce the temperature of recirculated exhaust gas. The present invention is not limited to use with coolers having only a liquid such as water and/or antifreeze flowing therethrough.

Figure 3:
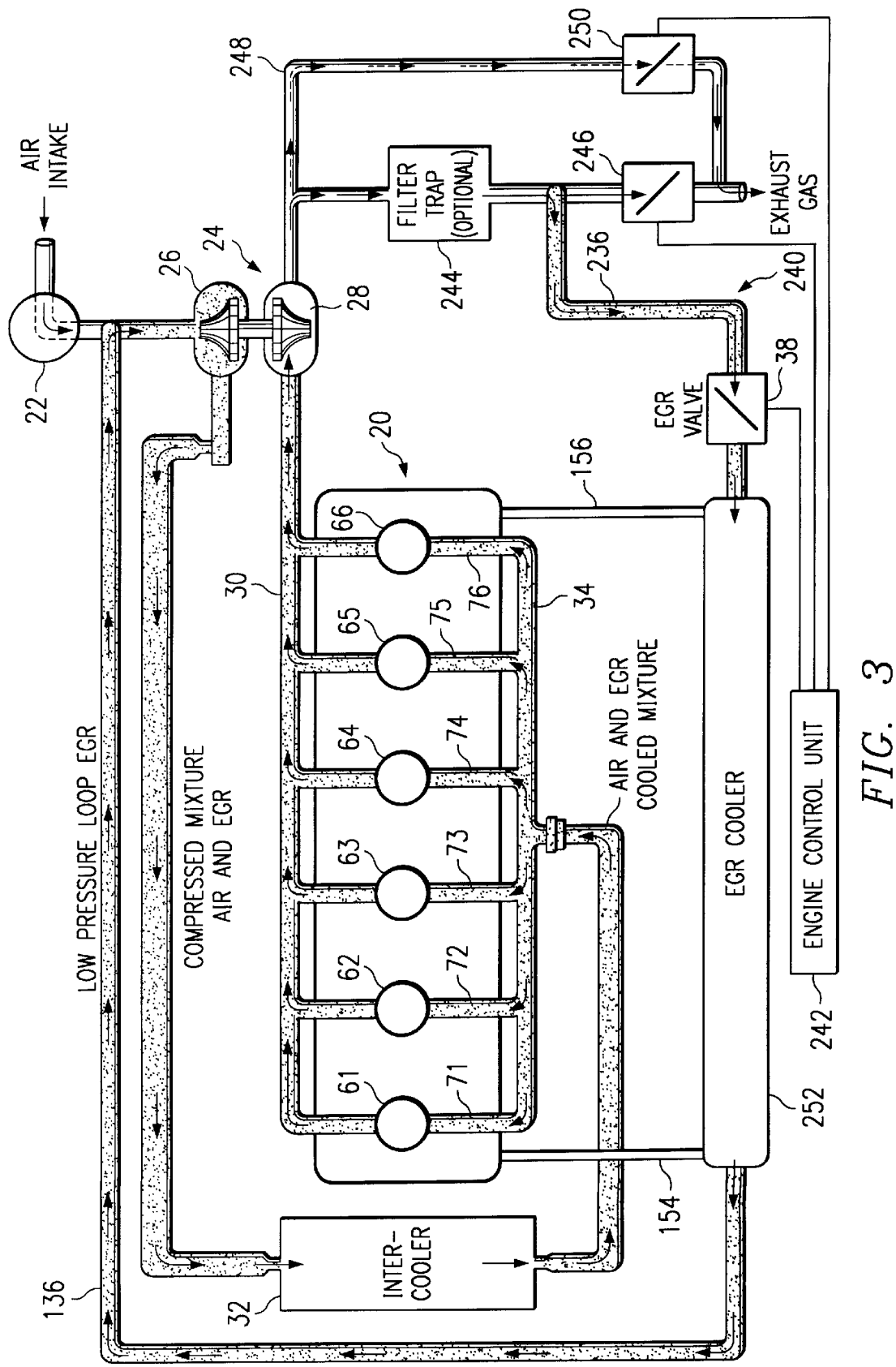
FIG. 3 is a schematic drawing showing a block diagram of various components associated with the heavy-duty turbocharged and intercooled diesel engine of FIG. 1 having a conventional low pressure loop exhaust gas recirculation system.

FIG. 3 shows internal combustion engine 20 having exhaust gas recirculation system or EGR system 240, which may sometimes be referred to as a low pressure loop exhaust gas recirculation system. Intake air flows through filter 22 to compressor 26 of turbocharger 24 and through intercooler 32 to intake manifold 34. Exhaust gas flows from exhaust manifold 30 through turbine 28 of turbocharger 24.

For many applications, exhaust gas will preferably flow from turbine 28 to filter trap 244. A portion of the exhaust gas exiting from filter trap 244 may then flow through EGR line 236 to EGR control valve 38. Back pressure valve 246 is preferably provided in the outlet from filter trap 244 downstream from EGR line 236. For some applications, an optional bypass line 248 may be provided to allow exhaust gas to bypass filter trap 244, EGR line 236, and back pressure valve 246. Back pressure valve 250 is also provided in bypass line 248 to control the flow of exhaust gas therethrough. Engine control unit 242 is provided to regulate the opening and closing of EGR control valve 38, back pressure valve 246 and back pressure valve 250 depending upon the operating conditions of engine 20.

Exhaust gas exiting from filter trap 244 is generally at a relatively low pressure in comparison with the induction pressure within intake manifold 34. Therefore, EGR line 236 may be coupled with the inlet to compressor 26 of turbocharger 24. A heated compressed mixture of intake air and recirculated exhaust gas flows from compressor 26 of turbocharger 24 through intercooler 32 to intake manifold 34.

EGR cooler 252 is preferably provided between EGR control valve 38 and the inlet to compressor 26 to reduce the temperature of recirculated exhaust gas entering compressor 26. For the embodiment shown in FIG. 3, EGR cooler 252 receives cooling water from the water cooling system associated with engine 20 and may sometimes be referred to as a "jacket water cooler." Coolant supply line 154 is preferably provided to direct cooling water from engine 20 to EGR cooler 252. Coolant return line 156 is provided to return cooling water from EGR cooler 252 to engine 20.

During most operating conditions associated with engine 20, the difference in pressure between the outlet of filter trap 244 and the inlet to compressor 26 of turbocharger 24 will be adequate for sufficient EGR flow rates to reduce $NO_x$ emissions to desired levels such as two grams per brake horsepower-hour (2.0 g/bhp-hr) or less when tested according to EPA transient emission cycle.

Low pressure loop EGR system 240, as shown in FIG. 3, may result in lower fuel consumption as a result of better turbocharger performance in comparison with high pressure loop EGR system 40 of FIG. 1. Since filter trap 244 will typically remove more than ninety percent (90%) of particulate matter from the exhaust gas before entering EGR line 236, component wear in engine 20 having low pressure loop EGR system 240 is generally reduced and engine life generally increased over a corresponding high pressure loop EGR system. Exhaust gas exiting from filter trap 244 and entering EGR line 236 is generally cooler than exhaust gas exiting from exhaust manifold 30 upstream from turbine 28 of turbocharger 24 in EGR system 40. Therefore, a low pressure loop EGR system, such as shown in FIG. 3, generally has a higher heat absorbing capacity as compared with a high pressure loop EGR system such as shown in FIG. 1.

Low pressure loop EGR systems, such as EGR system 240 shown in FIG. 3, also have some disadvantages. For some engine operating conditions, the exhaust gas pressure present at the outlet from filter trap 244 may not be high enough to provide sufficient EGR flow rates to significantly reduce $NO_x$ emissions. Therefore, back pressure valve 246 may be required to develop sufficient differential pressure across EGR control valve 38 to provide required exhaust gas flow rates from filter trap 244 to the inlet of compressor 26.

The efficiency of turbocharger 24 may be reduced due to the higher temperature of recirculated exhaust gas at the inlet to compressor 26. A low pressure loop EGR system, such as EGR system 240 shown in FIG. 3, may require additional components such as one or more back pressure valves, an EGR cooler and more extensive piping or ducting as compared to a high pressure loop EGR system. These additional components further complicate assembly and maintenance of engine 20.

Additional information concerning low pressure loop and high pressure loop exhaust gas recirculation systems may be found in co-pending U.S. application entitled Method and Apparatus for Exhaust Gas Recirculation Control and Power Augmentation in a Combustion Engine, Ser. No. 08/870,633, filed Jun. 6, 1997, now U.S. Pat. No. 5,927,075.

FIG. 4 shows internal combustion engine 20 having exhaust gas recirculation system or EGR system 340, which incorporates various teachings of the present invention. EGR system 340 may be generally described as a low pressure loop EGR system, since exhaust gas recirculation line or EGR line 336 is connected with the outlet from filter trap 244. EGR system 340 preferably includes exhaust gas recirculation pump or EGR pump 146, EGR reservoir and cooler 152, a plurality of exhaust gas conduits 191–196, and a corresponding plurality of exhaust gas metering valves 161–166 as previously described with respect to EGR system 140.

EGR line 336 directs a portion of the exhaust gas flowing through the outlet from filter trap 244 to the inlet of EGR pump 146. As previously described with respect to EGR system 140, EGR pump 146 is provided to maintain the desired pressure for recirculated exhaust gas within EGR reservoir and cooler 152 to allow recirculated exhaust gas to flow through EGR conduits 191–196 to respective cylinders 61–66. As a result of including EGR pump 146 as part of EGR system 340, it is not necessary to direct recirculated exhaust gas from EGR reservoir and cooler 152 to the inlet of compressor 26 as shown in FIG. 3 for EGR system 240. Engine control unit 342 preferably sends an appropriate signal to operate EGR pump 146, back pressure valves 246 and 250, and EGR metering valves 161–166 to provide the desired recirculated exhaust gas flowrate to each cylinder 61–66. For some applications, back pressure valves 246 and/or 250 may not be required since EGR pump 146 is included within EGR line 336.

One of the benefits of the present invention, as demonstrated by EGR system 140 and EGR system 340 is that the same EGR pump, EGR reservoir and cooler, EGR conduits and EGR metering valves may be used with either a high pressure loop EGR system or a low pressure loop EGR system. Also, the same engine control unit may be satisfactorily used with EGR systems 40, 140, 240, and 340. As a result, teachings of the present invention may be used with a wide variety of internal combustion engines and associated exhaust gas recirculation systems. All ducting and piping associated with EGR systems 140 and 340 are preferably sized and routed to avoid excessive bends and joints.

For some applications, a partition (not expressly shown) may be installed within a conventional jacket water cooler to provide both intercooler for compressed air supplied to cylinders 61–66 and an EGR reservoir and cooler for recirculated exhaust gas supplied to cylinders 61–66. The partition prevents mixing of heated compressed air flowing from compressor 26 with recirculated exhaust gas flowing from EGR pump 146. The volume of an EGR reservoir and cooler formed in accordance with teachings of the present invention is preferably selected to meet the maximum recirculated exhaust gas flowrates that will be required for operating conditions associated with engine 20.

When a diesel engine operates at speeds below its associated peak torque speed and with an open throttle to accommodate a heavy engine load, excessive amounts of smoke will frequently be emitted in the exhaust gas. Low rotational speed of the associated turbocharger will generally not provide the intake manifold with sufficient boost pressure or induction pressure required for good smoke-free combustion of the diesel fuel. Various control devices such as "puff limiters," aneroids and/or other boost control devices have frequently been added to turbocharged and intercooled diesel engines to reduce fuel rates at speeds generally below the peak torque speed, and therefore, limit smoke emissions by limiting the output of the associated diesel engine. Heavy exhaust smoke emissions are typically observed when a diesel engine operates a low speed with heavy engine loads.

Diesel engines operating at low speeds and with little or no engine load generally operate very satisfactorily with relatively high EGR flow rates because the air/fuel ratio under these operating conditions is very high (75:1 or greater). A diesel engine operating at its associated peak torque speed may have an air/fuel ratio of approximately 25:1. At rated speed, full load engine conditions, a typical air/fuel ratio for a medium range heavy-duty diesel engine is approximately 30:1. Therefore, the volume or flow rate of recirculated exhaust gas is generally decreased as engine operating conditions approach these limits to avoid formation of smoke in the exhaust gas emissions from the associated engine.

EGR pump 146 and EGR reservoir and cooler 152 cooperate with each other to insure that a sufficient volume of recirculated exhaust gas is available at the required pressure to flow through EGR metering valves 161–166 to the respective cylinders 61–66 even during engine operating conditions when exhaust gas pressure in exhaust manifold 30 is below desired levels for appropriate exhaust gas recirculation. As shown in FIGS. 5, 6 and 8, EGR reservoir and cooler 152 is preferably located relatively close to intake ports 71–76 to minimize the time required for flow recirculated exhaust gas to flow to cylinders 61–66. FIG. 7 shows EGR reservoir and cooler 152 located relatively close to intake port 271. The volume and pressure maintained within an EGR reservoir and cooler incorporating teachings of the present invention is a function of the recirculated exhaust gas injection rate required to reduce $NO_x$ emissions to below a desired level for a given engine speed and load condition and air pressure within the respective intake ports at the location of recirculated exhaust gas systems.

Various types of metering valves and control valves may be satisfactorily used to control the flow of recirculated exhaust gas through EGR conduits 191–196 to respective cylinders 61–66. EGR metering valves 161–166 used in EGR system 140 and 140a preferably have the same design. Therefore, only metering valve 161 will be discussed in detail.

For the embodiments shown in FIGS. 6, 7 and 8, EGR metering valve 161 may be described as a spring-loaded electrically operated solenoid valve. Engine control unit 142 provides an appropriate signal through wires 168 and 169 to vary the position of valve member 170. For this particular embodiment, spring 172 is provided to close EGR metering valve 161 when electrical power is no longer supplied to the associated solenoid.

EGR metering valve 161 preferably includes cavity 174 which remains filled with cool, relatively high pressure recirculated exhaust gas. Thus, when the associated solenoid is energized by engine control unit 142 and valve member 170 moves to its open position, recirculated exhaust gas is immediately available to flow into the associated intake port 71 for the embodiments shown in FIGS. 6 and 8 or intake port 271 for the embodiment shown in FIG. 7. When recirculated exhaust gas is no longer required to maintain low levels of $NO_x$ emissions, the solenoid in EGR metering valve 161 is de-energized, which allows spring 172 to rapidly close valve member 170 and stop the flow of recirculated exhaust gas to the associated cylinder 61. Thus, engine control unit 142, in cooperation with EGR metering valves 161–166 may precisely meter the amount of recirculated exhaust gas introduced into each cylinder 61–66 during each intake stroke of a piston (not expressly shown) associated with each cylinder 61–66. During the operation of engine 20, the time periods when EGR metering valves 161–166 are open and closed may be varied in a manner similar to electronic fuel injectors which precisely meter the flow of fuel to each cylinder 61–66.

Each EGR metering valve 161–166 is preferably disposed immediately adjacent to its respective intake port 71–76 such as shown in FIG. 6 for EGR metering valve 161. This location of EGR metering valves 161–166 further minimizes the time required for EGR system 140 or EGR system 340 to respond to changes in operating conditions associated with engine 20. For some applications, EGR metering valves 161–166 may be satisfactorily installed in other locations such as within intake manifold 34 immediately adjacent to the inlet of respective intake ports 71–76. For other applications, EGR metering valves 161–166 may be combined with respective nozzles (not expressly shown) to direct the flow of recirculated exhaust gas at an angle counter to the flow of intake air within respective intake ports 171–176 to further enhance the mixing of recirculated exhaust gas with intake air. For still other applications, recirculated exhaust gas may be introduced into cylinders 61–66 through respective venturis (see FIG. 7), nozzles (not expressly shown), or orifices (not expressly shown) to promote the mixing of recirculated exhaust gas with intake air. Such use of venturis, nozzles and/or orifices may also allow reducing the recirculated exhaust gas pressure maintained within EGR reservoir and cooler 152.

A portion of engine 20a having EGR system 140 mounted thereon is shown FIG. 7. Engine 20a is substantially the same as previously described engine 20 except for modified intake ports. For purposes of illustration only one intake port 271 is shown in FIG. 7. However, each intake port associated with engine 20a will preferably have substantially the same configuration as intake port 271.

As shown in FIG. 7, a portion of intake port 271 has the general configuration of a venturi. First opening or inlet 273 of intake port 271 is preferably disposed adjacent to and in communication with intake manifold 34. Second opening or outlet 274 of intake manifold 271 is preferably disposed adjacent to and in fluid communication with the associated cylinder 61 (not expressly shown). Intake port 271 preferably includes reduced diameter area 272 which may sometimes be described as a "venturi throat." Recirculated exhaust gas injection port 276 is preferably formed within intake port 271 immediately adjacent to reduced diameter portion 272. As a result, when metering valve 161 is in its open position, recirculated exhaust gas may flow from cavity 174 into reduced diameter portion 272 in intake port 271.

Forming a portion of intake 271 with having the general configuration of a venturi results in the pressure of intake air flowing through throat or reduced diameter portion 272 being less than the pressure of intake air within manifold 34 at first opening 273 or at second opening 274 adjacent to cylinder 61. Lower intake air pressure at throat or reduced diameter section 272 will generally result in a greater difference in pressure between exhaust gas contained within EGR cooler and reservoir 152 and reduced diameter portion 272 for the same engine operating condition as compared to intake port 71 shown in FIG. 6. Thus, a higher exhaust gas flowrate is possible from EGR cooler and reservoir 152 through metering valve 161 or alternatively, the pressure of exhaust gas stored within EGR reservoir and cooler 152 may be reduced to provide the same exhaust gas flowrate as compared with supplying exhaust gas from EGR cooler 152 to intake port 71 shown in FIG. 6. Reducing the required pressure within EGR reservoir and cooler 152 reduces the amount of energy required to supply exhaust gas to EGR reservoir and cooler 152. Supplying exhaust gas from metering valve 161 to reduced diameter portion 272 in intake port 271 will also produce increased mixing of recirculated exhaust gas with air flowing therethrough.

Various types of mechanical devices such as a nozzle (not expressly shown) or an orifice (not expressly shown) may also be formed within an intake port to provide a low pressure area substantially the same as reduced diameter portion 272. The use of a nozzle or an orifice to provide a low pressure area similar to the low pressure area associated with a venturi is well known in the art. Recirculated exhaust gas injection port 276 may be located immediately adjacent to the low pressure area associated with a nozzle or an orifice in accordance with teachings of the present invention.

In FIG. 8, exhaust recirculation 140a incorporating teachings of the present invention is shown mounted on a portion of engine 20. EGR system 140a is substantially the same as previously described EGR system 140 except pipe 260 is shown attached to metering valve 161 to supply exhaust gas from cavity 174 to the respective intake port 71. Pipe 260 preferably has longitudinal bore 262 extending therethrough. For the embodiment shown in FIG. 8, the end of pipe 260 opposite from metering valve 161 is closed. A plurality of perforations or openings 264 are formed in pipe 260 to allow recirculated exhaust gas to flow from cavity 174 through longitudinal bore 262 and to exit through perforations 264 into intake port 71. Introducing recirculated exhaust gas through perforations 264 improves the mixing of exhaust gas with air flowing through intake port 71.

One of the technical benefits of the present invention includes modifying pipe 260 and the locations of perforations 264 to provide the optimum mixing of recirculated exhaust gas with air. For some applications, the portion of pipe 260 disposed within intake port 71 may have a ring configuration (not expressly shown) or a generally U-shaped configuration (not expressly shown). The size, shape, location and configuration of pipe 260 and the size, shape, location and configuration of associated perforations 264 may be modified in accordance with teachings of the present invention to optimize mixing of recirculated exhaust gas within intake port 71. Pipe 260 may also be combined with an intake port having the general configuration of a venturi as previously described with respect to intake port 271. For some applications, an intake port a nozzle or an orifice may be satisfactorily used as an alternative to a venturi.

For some applications, filter traps 44 and 244 may periodically incinerate particulate matter removed from the exhaust gas flowing therethrough. Such periodic or active regeneration filter traps may include electrical heaters or an igniter and a supply of air to intermittently burn carbon removed from the exhaust gas. For other applications, filter traps 44 and 244 may be passively regenerated by processes such as continuous catalytic oxidation of particulate matter through the use of organometallic compounds which are added to the fuel to reduce the ignition temperature of carbon removed from the exhaust gas. A wide variety of passive and active filter traps associated with diesel engine exhaust after treatment are commercially available and may be satisfactorily used with an exhaust gas recirculation system incorporating teachings of the present invention. Catalytic converters may be satisfactorily used when the present invention is combined with engines that operate on various types of fuels, other than diesel, which do not produce soot.

Reducing the temperature of recirculated exhaust gas passing through EGR reservoir and cooler 152 increases the density of recirculated exhaust gas and therefore the density of the intake air/exhaust gas mixture supplied to intake ports 71–76 to improve specific power output of engine 20 and maximize the effectiveness of recirculated exhaust gas to reduce $NO_x$ emissions. This is in contrast with other systems which rely on residual exhaust gas for $NO_x$ emission control. In the case of residual exhaust gas control, cooling is difficult if not impossible.

The ratio of recirculated exhaust gas and fresh intake air within intake ports 71–76 may be determined by an appropriate $NO_x$ reduction algorithm based on the desired level of $NO_x$ emissions for a given set of engine operating conditions. Metering valves satisfactory for use with the present invention can be made from existing exhaust gas recirculation (EGR) valves such as EGR valves associated with Caterpillar Low Emission 3208 Engine with EGR.

Turbodyne Systems, Inc. with offices located in Vancouver, British Columbia and Carpinteria, Calif. offers an electronic demand charger (EDC) which incorporates an electrical motor with a compressor that may be satisfactorily used with the present invention to replace or supplement turbocharger 24. U.S. Pat. No. 5,605,045 entitled Turbocharging System With Integral Assisting Electric Motor and Cooling System Therefor provides one example of an electrically driven compressor. U.S. Pat. No. 5,560,208 entitled Motor-Assisted Variable Geometry Turbocharging System provides another example of a turbocharger having an electrical motor as a part thereof. Both of these patents are incorporated by reference for all purposes in this application.

Teachings of the present invention may be incorporated as part of a wide variety of engine control modules or systems such as shown in U.S. Pat. No. 5,524,599 entitled Fuzzy Logic Air/Fuel Controller; U.S. Pat. Nos. 5,284,116; 5,123,397; and 4,945,870, all entitled Vehicle Management Computer. Electronic control units 42, 142, 242 and 342 preferably include at least one processor for calculating air/fuel ratios and intake air/EGR ratios in accordance with teachings of the present invention. Electronic control units 42, 142, 242 and 342 may also include at least one electronic data storage unit having desired engine operating parameters such as desired air/fuel ratios, EGR flow rates, and allowable $NO_x$ emission rates, corresponding with various engine operating conditions such as engine speed and engine load. The ratio of intake air and recirculated exhaust gas in the intake port for each cylinder may be determined by air flow requirements to maintain optimum air/fuel ratios for efficient engine performance and required EGR flow rates to reduce $NO_x$ emissions based on current engine operating conditions.

Exhaust gas recirculation systems incorporating teachings of the present invention provide reduced nitrogen oxide ($NO_x$) emissions through EGR and reduced particulate emissions by preferably using a filter trap to remove carbon particles and soot from the exhaust gas. Both active regeneration filter traps and passive regeneration filter traps may be satisfactorily used with the present invention. Active regeneration filter traps have an outside source of energy such as electrical power to elevate exhaust gas temperatures to over six hundred degrees Celsius (600° C.) to burn accumulated carbon in the associated trap. Passive regeneration filter traps do not require an outside source of energy to heat the exhaust gas passing therethrough to the desired temperature.

Although the present invention has been described in great detail, it should be understood that various changes, substitutions and alterations can be made hereto without departing from the spirit and scope of the invention as defined by the appended claims.

What is claimed is:

1. An exhaust gas recirculation system for an internal combustion engine having at least one cylinder with an intake manifold for supplying air to the cylinder and an exhaust manifold for receiving exhaust gas from the cylinder comprising:

an exhaust gas recirculation (EGR) line to receive a portion of the exhaust gas flowing from the exhaust;

an EGR cooler coupled with the EGR line operable to cool only recirculated exhaust gas;

a plurality of exhaust gas conduits, each extending from the EGR lines to an associated intake port for a cylinder of the engine, the junction of each exhaust gas conduit and each intake port being proximate to an associated cylinder;

a plurality of EGR control valves, a control valve disposed within each exhaust gas conduit, for controlling only recirculated exhaust gas flow to the associated cylinder; and a control unit for regulating the flow of recirculated exhaust gas through each control valve to the cylinder.

2. The system of claim 1 wherein the internal combustion engine further comprises a diesel engine.

3. The system of claim 1 further comprising:

a turbocharger having a compressor for supplying intake air to the intake manifold and a turbine which receives exhaust gas from the exhaust manifold to operate the compressor; and the turbine having an outlet coupled with a filter trap whereby exhaust gas exiting from the turbine will flow through the filter trap to substantially reduce particulate matter in the exhaust gas.

4. The system of claim 1, further comprising:
the EGR line coupled with an outlet from the filter trap; and
an EGR pump disposed within the EGR line to increase the pressure of exhaust gas within the reservoir to a value greater than the pressure of the intake air within the intake manifold wherein each control valve is independently controllable.

5. The system of claim 1 further comprising an EGR pump coupled to the EGR line.

6. The system of claim 5 further comprising:
the EGR pump having an inlet and an outlet coupled with the EGR line;
a bypass line having one end coupled with the EGR line adjacent the inlet of the EGR pump and another end of the bypass line coupled adjacent to the outlet of the EGR pump; and
a flow control device disposed within the bypass line to allow exhaust gas in the exhaust manifold to flow through the bypass line in one direction and to block exhaust gas discharged from the outlet of the recirculation pump from flowing in the opposite direction through the bypass line.

7. The system of claim 1, further comprising a reservoir coupled with the EGR line to control pressure of the exhaust gas in the EGR line.

8. The system of claim 1, wherein each EGR control valve is located immediately downstream of the junction of the associated exhaust gas conduit with a cylinder.

9. The system of claim 1 further comprising a heat exchanger to reduce the temperature of the recirculated exhaust gas supplied to each cylinder to improve the efficiency of the associated internal combustion engine.

10. The system of claim 1 further comprising an engine control unit providing a signal to each control valve to vary the volume of recirculated exhaust gas supplied to each cylinder in response to changes in operating conditions of the internal combustion engine.

11. The system of claim 1 further comprising:
each intake port having a low pressure area formed therein between the intake manifold to the associated cylinder.

12. The system of claim 1 further comprising:
a pipe extending from each control valve into the associated intake port.

13. A heavy-duty diesel engine having a plurality of cylinders with an intake manifold and an exhaust manifold coupled with the cylinders and an exhaust gas recirculation (EGR) system for supplying recirculated exhaust gas to the cylinders, each cylinder having an intake port, the EGR system comprising:
an EGR line coupled with the exhaust manifold to receive a portion of the exhaust gas flowing from the exhaust manifold
an EGR cooler coupled with the EGR line operable to cool only recirculated exhaust gas;
a plurality of exhaust gas conduits, each extending from the EGR line to an associated intake port, the junction of each exhaust gas conduit and each intake port being proximate to an associated cylinder;
a plurality of EGR control valves, a control valve disposed within each exhaust gas conduit for controlling only recirculated exhaust gas flow to the associated cylinder; and
an engine control unit for regulating the position of each metering valve to vary the flow of recirculated exhaust gas supplied to each intake port in response to changes in operating conditions of the engine.

14. The system of claim 13 further comprising:
a turbocharger having a compressor for supplying intake air to the intake manifold and a turbine for receiving exhaust gas from the exhaust manifold to operate the compressor;
a conduit for supplying exhaust gas from the exhaust manifold to turbine; and
the EGR line coupled with the conduit to receive the portion of the exhaust gas before the exhaust gas enters the turbine and provide a high pressure loop EGR system.

15. The system of claim 13 further comprising:
a turbocharger having a compressor for supplying intake air to the manifold and a turbine for receiving exhaust gas from the exhaust manifold to operate the compressor;
a conduit for directing exhaust gas from the turbine to a filter trap; and
the EGR line coupled with an outlet from the filter trap to receive the portion of the exhaust gas and provide a low pressure loop EGR system.

16. The system of claim 13, wherein each EGR control valve is disposed immediately adjacent to the associated cylinder.

17. The system of claim 13 further comprising an EGR pump to provide pressure of recirculated exhaust gas in the EGR line.

18. The system of claim 13, wherein each EGR control valve has a cavity disposed therein.

19. A method for controlling recirculation of exhaust gas in an internal combustion engine having a plurality of cylinders with an intake manifold and an exhaust manifold coupled with the cylinders, comprising:
supplying intake air to the intake manifold;
directing a first portion of exhaust gas flowing from the exhaust manifold to an exhaust gas recirculation line;
storing a portion of the exhaust gas flowing through the exhaust gas recirculation line in a reservoir to provide a supply of recirculated exhaust gas;
supplying recirculated exhaust gas from the reservoir to each cylinder through a respective exhaust gas conduit; and
controlling the flow of recirculated exhaust gas to each cylinder by a respective metering valve disposed in each exhaust gas conduit;
wherein the supplying step is performed by performing the following steps: supplying at least a second portion of the exhaust gas from the exhaust manifold to a turbine in a turbocharger having a compressor that is operated by the turbine, supplying compressed air from the compressor to the intake manifold, communicating exhaust gas flowing from the turbine through a filter trap to remove particulate matter from the exhaust gas, and directing the first portion of the exhaust gas flowing from the exhaust manifold through the exhaust gas recirculation line prior to the second portion of the exhaust gas entering the turbine.

20. A method for controlling recirculation of exhaust gas in an internal combustion engine having a plurality of cylinders with an intake manifold and an exhaust manifold coupled with the cylinders, comprising:

supplying intake air to the intake manifold;

directing a first portion of exhaust gas flowing from the exhaust manifold to an exhaust gas recirculation line;

storing a portion of the exhaust gas flowing through the exhaust gas recirculation line in a reservoir to provide a supply of recirculated exhaust gas;

supplying recirculated exhaust gas from the reservoir to each cylinder through a respective exhaust gas conduit; and controlling the flow of recirculated exhaust gas to each cylinder by a respective metering valve disposed in each exhaust gas conduit;

wherein the supplying step is performed by performing the following steps: supplying exhaust gas from the exhaust manifold to a turbine in a turbocharger having a compressor that is operated by the turbine, supplying compressed air from the compressor to the intake manifold, communicating exhaust gas flowing from the turbine through a filter trap to remove particulate matter from the exhaust gas, and directing the portion of the exhaust gas flowing from the exhaust manifold through the exhaust gas recirculation line after the exhaust gas exits from the filter trap.

21. A method for controlling recirculation of exhaust gas in an internal combustion engine having a plurality of cylinders with an intake manifold and an exhaust manifold coupled with the cylinders, comprising:

supplying intake air to the intake manifold;

directing a first portion of exhaust gas flowing from the exhaust manifold to an exhaust gas recirculation line;

storing a portion of the exhaust gas flowing through the exhaust gas recirculation line in a reservoir to provide a supply of recirculated exhaust gas;

supplying recirculated exhaust gas from the reservoir to each cylinder through a respective exhaust gas conduit;

controlling the flow of recirculated exhaust gas to each cylinder by a respective metering valve disposed in each exhaust gas conduit; and cooling recirculated exhaust gas stored in the reservoir to a desired temperature.

22. A method for controlling recirculation of exhaust gas in an internal combustion engine having a plurality of cylinders with an intake manifold and an exhaust manifold coupled with the cylinders, comprising:

supplying intake air to the intake manifold;

directing a first portion of exhaust gas flowing from the exhaust manifold to an exhaust gas recirculation line;

storing a portion of the exhaust gas flowing through the exhaust gas recirculation line in a reservoir to provide a supply of recirculated exhaust gas;

supplying recirculated exhaust gas from the reservoir to each cylinder through a respective exhaust gas conduit;

controlling the flow of recirculated exhaust gas to each cylinder by a respective metering valve disposed in each exhaust gas conduit; and mixing recirculated exhaust gas supplied to each cylinder with intake air within an intake port of the respective cylinder.

23. A method for controlling recirculation of exhaust gas in an internal combustion engine having a plurality of cylinders with an intake manifold and an exhaust manifold coupled with the cylinders, comprising:

supplying intake air to the intake manifold;

directing a first portion of exhaust gas flowing from the exhaust manifold to an exhaust gas recirculation line;

storing a portion of the exhaust gas flowing through the exhaust gas recirculation line in a reservoir to provide a supply of recirculated exhaust gas;

supplying recirculated exhaust gas from the reservoir to each cylinder through a respective exhaust gas conduit;

controlling the flow of recirculated exhaust gas to each cylinder by a respective metering valve disposed in each exhaust gas conduit;

forming a respective intake port between the intake manifold and the cylinder;

forming a flow restriction within each intake port selected from the group consisting of a venturi, a nozzle, or an orifice, to form a low pressure area within the respective intake port; and injecting recirculated exhaust gas into the low pressure area.

* * * * *